3,143,567
PROCESS FOR PRODUCING AROMATIC CARBOX-
YLIC ACIDS AND ALKALI AND ALKALINE
EARTH METAL SALTS THEREOF
David O. De Pree, Baton Rouge, La., assignor to Ethyl
Corporation, New York, N.Y., a corporation of Virginia
No Drawing. Filed Mar. 21, 1960, Ser. No. 16,196
9 Claims. (Cl. 260—515)

The instant invention relates to a process for the preparation of aromatic carboxylic acids and the alkali or alkaline earth metal salts thereof. In particular, the subject invention is concerned with the preparation of alkali or alkaline earth metallometallic salts of aromatic monocarboxylic acids which are particularly useful in the preparation of aromatic dicarboxylic acids and salts thereof.

Isomeric mixtures are a necessary concomitant to the preparation of aromatic dicarboxylic acids. In order to separate the respective isomers from such isomeric mixtures present processes resort to expensive physical separation techniques. Because of the greater difficulty involved in separating isomeric mixtures of the aromatic dibasic acid end-product, presently known processes lean very heavily toward utilizing highly purified starting materials containing a very high percentage of only one isomer. For example, the aromatic dicarboxylic acid, terephthalic acid, is produced from xylene by oxidation and subsequent acidification. Xylene is marketed commercially as an isomeric mixture of the meta and para isomers. (The ortho xylene is separated from the meta and para xylene by distillation techniques. The meta and para isomers, having almost identical boiling points, are not conveniently separated.) The price of this isomeric commercial xylene is dependent upon the content of meta isomer contained therein—the price increasing as the amount of meta isomer decreases. Since it is more desirable to separate the meta and para xylene isomers, rather than undertaking the difficult separation of the terephthalic acid (produced from the para isomer) from the isophthalic acid (produced from the meta isomer), producers of phthalic acids are obliged to utilize the more expensive low-meta-content isomeric xylene mixture. Thus, in producing pure terephthalic acid and pure phthalic acid by the above described process, it becomes necessary to proceed through at least three physical separations of isomeric mixtures. In the first place, the crude meta, para and ortho isomeric xylene mixture is separated into an ortho xylene fraction and a meta, para xylene fraction. The meta, para xylene fraction then must undergo a further physical separation to remove a substantial portion of the undesirable meta isomer. This predominantly para isomeric mixture is then oxidized to produce impure terephthalic acid—i.e. isophthalic acid (from the meta xylene impurities) is formed therewith as an undesirable by-product. If a pure terephthalic acid material is desired the product must be further separated.

The same problems attendant to the preparation of aromatic dicarboxylic acids are also involved in the preparation of metallometallic salts of aromatic monocarboxylic acids. (The latter are particularly useful in the preparation of the aromatic dicarboxylic acids, as will appear more fully hereinafter.) This statement will be further understood by reference again to a specific illustrative example. The highly novel compounds, alpha-sodio-sodium o-toluate and alpha-sodio-sodium p-toluate, are respectively produced when o-toluic acid and p-toluic acid are metallated with sodium. Since the toluic acid starting materials are produced by oxidation of an isomeric mixture of xylene (in the same manner as above described for the preparation of terephthalic and phthalic acids), it can readily be seen that the same problems with regard to physical separation of the undesirable meta isomer are involved. Heretofore, it had been thought necessary to use pure o-toluic acid or pure p-toluic acid in producing the α-sodio-sodium ortho or para toluate derivatives. Thus, these pure toluic acids which are free from the undesirable meta isomer, had to be reactants, or the salts thereof, purified via the same physical separation steps discussed above, before the sodium metallation could be undertaken. In this manner pure product was produced, free of the undesirable meta isomer. This product, upon carboxylation, followed by acidification yielded the pure aromatic dicarboxylic acids, homophthalic acid (from the ortho isomer) and homoterephthalic acid (from the para isomer).

However, as a general rule, each physical separation step required by a process substantially increases the cost of the product produced by that process. Not only does each separation step increase capital expenditure for the building of a plant by the amount of additional equipment needed to effect the separation, but, also, the overall cost of operation of the plant is increased by the additional overhead acquired through extra labor, power, maintenance and the like needed to operate each respective separation step. A process which completely eliminates such complex separation procedures, and the need for expensive equipment ancillary to such operation, would provide a significant commercial impetus to this area of technology. The provision of such a process is the primary object of this invention.

Another object of this invention is the economical and commercially adaptable preparation of alkali and alkaline earth metallometallic salts of aromatic carboxylic acids. A further object is to prepare pure alkali or alkaline earth metal alkyl benzoates—from crude and extremely economical isomeric mixtures of an alkyl substituted benzene. A particular object of this invention is the conversion of these metallometallic salts of aromatic carboxylic acids to aromatic dicarboxylic acids. In this latter regard the economical preparation of pure aromatic dicarboxylic acids (i.e. free from undesirable isomers) is a particularly significant object.

These and other objects of this invention are accomplished by a process which comprises reacting an alkali or alkaline earth metallating agent, selected from the group consisting of metal amides, metal hydrides and a metal, with an alkali or alkaline earth metal salt of an alkyl substituted benzoic acid, containing an α-hydrogen atom on said alkyl group. In this manner there is produced a metallometallic salt of an aromatic monocarboxylic acid (said metallo and metallic substituents being selected from the group consisting of alkali and alkaline earth metals) which is free from undesirable isomeric impurities. The metallometallic salts of an aromatic monocarboxylic acid, produced in the above described manner, when carboxylated, as described more fully hereinafter, produce a pure alkali or alkaline earth metal salt of an aromatic dicarboxylic acid. Thus, also within the scope of this invention is a process for the preparation of alkali or alkaline earth metal salts of an aromatic dicarboxylic acid. This latter process comprises carboxylating a metallometallic salt of an aromatic monocarboxylic acid (said metallo and metallic substituents being selected from the group consisting of alkali and alkaline earth metals) which is free from undesirable isomeric impurities—generally the meta isomer. In the preferred case a non-isomeric metallometallic salt of an aromatic monocarboxylic acid is employed.

Another preferred embodiment of this invention is the preparation of a metallometallic salt of an aromatic monocarboxylic acid which comprises reacting a metallating agent, as defined above with a mixture of alkyl substituted benzoic acid isomers. These isomeric mixtures are commercially available and economical, and are composed of the meta isomer in admixture with the ortho or para isomer, or both. The utilization of these ring isomeric mixtures, containing the highly undesirable meta isomer, presents absolutely no problem in carrying out the process of this invention, since the meta isomer is chemically obviated during the reaction of the isomeric mixture with the aforementioned metallating agent. Although not wishing to be bound by theory, it appears that the meta isomer is decomposed during the course of the reaction.

In carrying out the above described reaction, it is preferred to prepare the alkyl substituted benzoic acid from an alkyl substituted aromatic hydrocarbon wherein the aromatic moiety contains an alkyl substituted benzene ring. For economical reasons it is preferred that the alkyl substituted aromatic hydrocarbon be a ring isomeric mixture—that is a mixture containing the ortho or para and meta isomers with reference to the position of the alkyl substituents to the carboxy group on the benzene ring of said benzoic acid.

The process of this invention can be run in a wide diversity of processing equipment, however, particularly excellent results have been obtained when the aforesaid metallating agent is reacted with the aforesaid alkyl substituted benzoic acid while mixing and grinding the reactants. For this purpose it is preferred to employ a ballmill reaction vessel.

Although the above reaction has been described as being conducted with an alkyl substituted benzoic acid, it is to be understood that an alkali or alkaline earth metal salt of an alkyl substituted bonzoic acid, as defined hereinabove, can also be employed. Thus, also, within the contemplation of this invention is a process for the preparation of a metallometallic salt of an aromatic monocarboxylic acid which process comprises reacting a metallating agent, as defined hereinbefore, with an alkali or alkaline earth metal salt of an alkyl substituted benzoic acid, containing an α-hydrogen atom on said alkyl group.

Therefore, an exceedingly preferred embodiment of this invention is a process for the preparation of an alkali metal salt of an α-alkali-metallo aromatic monocarboxylic acid which process comprises reacting an alkali metal with an alkyl substituted benzoic acid, wherein the akyl group contains 1 through 5 carbon atoms and at least one hydrogen atom on the α-carbon atom, the reaction being carried out while mixing and grinding the reactants in solid form. Generally, in order to achieve proper comminution of the reactants, the reaction is carried out in a ballmill reaction vessel. In carrying out this reaction it is preferred to utilize a temperature ranging from about 160° C. to about 200° C. although in general temperatures ranging to about 190° to 220° C. can be utilized. Best results however have been obtained within the former temperature range. It is preferred to conduct the reaction at atmospheric pressure. In mixing and grinding the reactants in their solid form it is preferred that the reactants be ground to a particle size of less than 100 microns and preferably less than 50 microns.

A specific illustration of the process of this invention, and a highly preferred embodiment thereof, is the reaction between an isomeric mixture of p-toluic acid and m-toluic acid and sodium, while mixing and grinding the reactants, preferably in a ballmill. In this manner there is produced pure α-sodio-sodium p-toluate free from the undesirable α-sodio-sodium m-toluate. Carboxylation of the non-isomeric α-sodio-sodium p-toluate with carbon dioxide, in situ—that is, in the ballmill reactor—produces the sodium salt of homoterephthalic acid. This acid can be used as the salt or can be converted by acidification to the free acid. The toluic acid starting material can be cheaply and economically prepared from a very cheap commercial grade of isomeric xylene containing a high meta content (ranging anywhere from about 3 to about 50 percent meta isomer content).

Thus, the highly novel process of this invention not only provides aromatic dicarboxylic acids, free from the undesirable isomer, but also provides the intermediary metallometallic salt of an aromatic monocarboxylic acid, free from the undesirable isomer; and the subject process accomplishes this highly desirable objective through a simple and straightforward chemical process—a chemical process requiring no expensive physical separation steps in producing the end product, free from the undesirable isomer. The removal of undesirable isomer by a chemical reaction, occurring during the ordinary conductance of the process of this invention, thus obviating all expensive physical separation steps, is a very advantageous and significant contribution to this area of technology. Furthermore, the process of this invention makes available a wide range of cheap raw materials for carrying out the invention. The process puts at the manufacturer's disposal a broad selection of inexpensive metallating agents, including extremely cheap and commercially available sodium. Also, commercially available crude isomeric mixtures of alkylated aromatics can be employed as starting materials. To one acquainted with the extreme difference in price between, for example, crude commercial xylene (i.e. containing an isomeric mixture of the meta, ortho or para isomer) and purified xylene (i.e. free from the metal isomer), the possibility of utilizing such crude isomeric mixtures has vast commercial significance—not only for the preparation of alkali and alkaline earth metallometallic salts of an aromatic monocarboxylic acid, but also in the preparation of highly useful aromatic dicarboxylic acids. Both the intermediary metallometallic salt of an aromatic monocarboxylic acid and the aromatic dicarboxylic acid have a wide field of applications, as will be more fully discussed hereinafter. Another significant advantage of this invention is the extensive choice of processing equipment available in carrying out the process of this invention. For example, extremely simple milling equipment can be employed. A particularly preferred embodiment in this respect is the utilization of a ballmill in carrying out the reaction. However, other processing equipment is available and can successfully be used. Thus, batch reactors or mixers using preground reactants, such as stirred, heated reaction vessels, or Baker-Perkins mixers; and continuous reactors or convertors can be employed in the subject process.

The following working examples more fully demonstrate the process of this invention. In these and the following examples, all parts and percentages are by weight.

In the following examples a stainless steel ballmill reactor was employed. This ballmill is provided with an outlet means and a means for charging, while maintaining the reaction mass under an inert atmosphere. The mill is operated with about a 30 percent ball charge and at a rotational speed of 60 percent of critical.

*Example I*

To the above described ballmill 79.2 parts of sodium-p-toluate (7 percent meta isomer content) and 11.5 parts of sodium metal were charged under nitrogen atmosphere. The nitrogen flush was shut off and the mill subjected to grinding and heating over a period of 6½ hours. The temperature of the reaction mass was raised from a temperature of 22° C. to about 223° C. At the end of this time no further gas evolution occurred and the reaction mass was cooled to room temperature. The mill was discharged under nitrogen and a sample of the dark blue-black product was submitted for analytical determination by the following method.

This method is based on the reaction of methyl alcohol with α-sodio-sodium p-toluate to form sodium p-toluate and sodium methoxide. The excess methyl alcohol is removed by vacuum at 100° C. and is measured. Unreacted sodium, in the form of sodium hydride, is determined by hydrogen evolution and the amount of sodium methoxide produced from the sodium hydride is subtracted from the gain in weight thus giving a corrected weight gain for the α-sodio-sodium p-toluate product.

By this analysis it was determined that α-sodio-sodium p-toluate was produced in better than 83 percent purity and was obtained free from the meta isomer. The only impurities found in the final product were unreacted starting materials and by-product toluene (apparently produced by the decomposition of the meta isomer).

Although the above example was run at a temperature up to about 223° C. it is preferred to conduct the reaction in the range of 70 to about 200° C. When conducted in this temperature range better overall control of the reaction is obtained, resulting in a purer α-sodio-sodium p-toluate product.

The following working example demonstrates the preparation of a metal salt of the aromatic dicarboxylic acid through in situ carboxylation of a metallometallic salt of an aromatic monocarboxylic acid.

*Example II*

To the above described ballmill was added 79.2 parts of sodium p-toluate (7 percent meta isomer content) and 12 parts sodium metal at atmospheric pressure and under nitrogen flush. Heating and grinding was commenced and the temperature of the reaction mass was raised, to initiate the reaction, (as evidenced by hydrogen evolution) from about 36° C. to about 200° C. After about 4 hours the temperature of the mass decreased substantially, i.e. to about 112° C. During this temperature dip toluene formation occurred. When gas evolution had essentially ceased, the reaction mass was allowed to cool under nitrogen sweep to about 25° C. The nitrogen sweep was discontinued. The reaction system was then flushed with carbon dioxide gas and grinding and heating was re-initiated. The reaction mass was raised from a temperature of from about 32° C. to about 110° C. When $CO_2$ take-up had ceased, the reaction mixture was cooled under nitrogen flush to about 25° C. whereupon the reaction mass was discharged and then hydrolyzed with water, followed by acidification with concentrated hydrochloric acid to a pH of 1.0. The product was then diluted and filtered to remove any unreacted p-toluic acid. (Little p-toluic acid was found.) The solids were essentially sodium chloride. The filtrate was then subjected to continuous extraction with diethyl ether and the ether extracts were evaporated to yield 65.8 parts of product (melting point 220–230° C.), which corresponded to a 73.2 percent yield of homoterephthalic acid. A portion of this material was recrystallized from diethyl ether to give a highly purity homoterephthalic acid, melting sharply at 239° C. (Literature: 237–238° C., Dictionary of Organic Compounds, vol. 2, Sir Ian Heilbrom, page 694, Oxford University Press (1953).)

Further identification of the product was effected by reacting 1 part of the product produced in Example I (melting at 239° C.) with 5 parts of thionyl chloride under reflux for a period of 30 to 45 minutes. The resulting clear solution was added to 15 parts of ice-cold concentrated ammonium hydroxide. The white precipitate which formed (the diamide) was filtered off and recrystallized from water (melting point found: 233° C.; Literature (Dunkelin, Ber. 22, 3214) 235° C. This identifies the resultant product as homoterephthal diamide, derived from homoterephthalic acid produced by the process of Example I.

Positive proof that the products produced by the process of this invention are free from the undesirable meta isomer was obtained by the following method.

Eighteen (18) grams of the homoterephthalic acid obtained in Example II was diluted with 50 ml. of methanol and 250 ml. of toluene in a 500 ml. vessel. Thereafter 1 gram of p-toluene sulfonic acid was charged to this reaction mass. The methanol, toluene and water were slowly taken off by refluxing the mixture. When approximately 100 milliliters had been removed the heat was shut off. The residue was washed with saturated brine to remove the p-toluene sulfonic acid and thereafter the mixture was dried over anhydrous calcium dichloride. The product was then subjected to vacuum distillation. A cut ranging from 148 to 156° at 1.5–2.0 mm. (Hg) was taken and examined by vapor phase chromatography. This examination showed that the product from this fraction was 99+ percent pure dimethyl ester of homoterephthalic acid. No evidence for the ester of homo isophthalic acid (the meta isomer) was found. This also agrees with the result of infrared examination upon the crude acid product which also shows absence of meta isomer.

Thus the meta isomer is destroyed in the reaction of sodium with isomeric sodium toluate.

*Example III*

To a reaction vessel provided with means for addition, heating and refluxing is added 40 parts of an isomeric xylene (approximately 70 percent para and 30 percent meta isomer content). Thereafter, 160 parts of water and 80 parts concentrated nitric acid are added to the reaction vessel. This mixture is thereafter refluxed until the isomeric xylene is converted to isomeric toluic acid—as evidenced by the organic layer settling to the bottom of the reaction vessel. The reaction mixture is then cooled to approximately 0° C. The solids are filtered off, washed with $H_2O$, and excess xylene and water are removed by vacuum distillation. The product is thereafter charged into the ballmill utilized in the previous working examples. Seven (7) parts of sodium are added to the ballmill under nitrogen atmosphere. The nitrogen flush is shut off and the mill is subjected to heating and grinding, while maintaining the temperature between about 50 and 80° C., until hydrogen evolution ceases. The sodium toluate and sodium mixture thereby resulting is heated to a temperature of about 170 to 200° C. until the hydrogen evolution, which commences upon reaching this temperature, ceases. The mill is then cooled to about 25° C. and thereafter pressured with carbon dioxide to a pressure of 250 p.s.i.g. The mill is then heated to a temperature of approximately 50 to 100° C. until $CO_2$ take-up has ceased. The reaction mass was then cooled and discharged. Upon acidification and separation, as described in Example II, pure homoterephthalic acid (free of the meta isomer) was obtained in high yield.

The alkyl substituted benzoic acid referred to hereinbefore is further defined as an aromatic monocarboxylic acid wherein the aromatic moiety contains 6 through 14 ring carbon atoms and, further, contains a benzene ring which is directly substituted by (1) the carboxy group of said monocarboxylic acid and (2) a substituted or unsubstituted alkyl group containing an α-hydrogen atom—at least one of the aforesaid alkyl groups being substituted on said benzene ring ortho or para to said carboxy group. In other words, the aromatic monocarboxylic acid is characterized by having (1) one carboxylic acid group directly bonded to an aromatic nucleus, (2) by having said nucleus substituted by an alkyl group carrying at least one α-hydrogen atom on its α-carbon, and (3) by containing in the molecule from 8 to about 36 carbon atoms. Although it is preferred to employ the free acid in the process of this invention, the alkali or alkaline earth metal salt of the acid can also be employed. However, utilization of the free acid and conversion, in situ, to the alkali and alkaline earth metal salt thereof provides a more convenient method of carrying out the reaction. The aromatic monocarboxylic acid employed in the process of this invention can be more fully demonstrated by the following illustrative formula

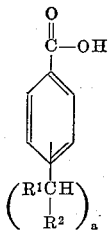

where $R^1$ and $R^2$ can be the same or different and are hydrogen or a hydrocarbon radical containing 1 through 20 carbon atoms such as alkyl, alkenyl or aryl hydrocarbon radicals; and subscript $a$ is an integer from 1 through 5 and, preferably, 1 through 3. At least one of the group ($R^1R^2CH$) is ortho or para substituted on the aromatic ring. In addition to being substituted with the carboxylic group and the $R^1R^2CH$ groups, the aromatic ring can be further substituted with hydrocarbon groups or inert groups—both defined hereinafter. The aromatic ring can also be a condensed ring system such as naphthalene or anthracene, or the aromatic ring can be a "bridged" ring system such as the general formula

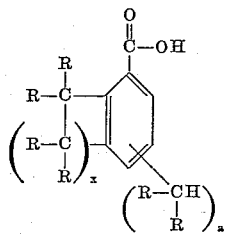

wherein $R^1$ and $R^2$ are as defined above, R has the same definition as $R^1$ and $R^2$, subscript $a$ has a value of from 0 through 3, and $x$ a value of 1 through 5.

The following compounds further demonstrate aromatic monocarboxylic acids which can be employed in the process of this invention: p-ethylbenzoic acid, o-propylbenzoic acid, p-methylbenzoic acid, 4-methyl-1-napthenoic acid, m,p-dimethylbenzoic acid, o,m,p-trimethylbenzoic acid, p-eicosylbenzoic acid, 2-methylanthracenoic acid, p-methyl-o-nitroso-benzoic acid, p-(diphenylmethyl)benzoic acid, p-(3-propenyl)benzoic acid, p-isopropylbenzoic acid, p-(1-methyl-n-propyl)benzoic acid, and the like.

As mentioned above one of the advantages of the instant process is that crude commercial grade isomeric mixtures of the acid or acid salt can be employed as a reactant in the process of this invention. Illustrative is a ring isomeric mixture of toluic acid or the alkali or alkaline earth metal salts thereof, such as sodium toluic acid. These ring isomeric mixtures can contain varying percentages of ortho, para or meta isomers. It is preferred to employ a ring isomeric mixture of an alkyl substituted benzoic acid which contains essentially para and meta isomers—generally ranging from about 1 to about 50 percent by weight of meta isomer.

Thus from the foregoing discussion, it can be seen that the metal salt of an alkyl substituted benzoic acid is a term encompassing non-isomeric reactants which are essentially either pure para alkyl derivatives or pure ortho alkyl derivatives. Furthermore, the term encompasses isomeric mixtures. These isomeric mixtures can consist essentially of ortho and para isomeric derivatives or they can be mixtures containing the para and meta derivatives in varying proportions or the ortho and meta derivatives in varying proportions. Furthermore, these isomeric mixtures can be mixtures containing a combination of ortho, para and meta alkyl derivatives.

The alkyl substituents on the above mentioned benzene ring of said aromatic monocarboxylic acid is an alkyl hydrocarbon containing between about 1 through 20 carbon atoms and further containing at least one α-hydrogen atom. When the alkyl groups are substituted, they are substituted with groups which are inert, under the reaction conditions of the process, to the metallating agent employed in the process of this invention. Such substituents include ethers, sulfates, sulfinates, sulfides, phosphites, phosphates, tertiary amino groups and the like. (These inert substituents can also be substituted for the hydrogen on the aromatic portion of said aromatic monocarboxylic acid.)

In addition to the above described inert substituents the alkyl groups can be substituted with other hydrocarbon groups containing between about 1 and 20 carbon atoms and preferably in the range of about 1 through about 10 carbon atoms. Illustrative of such groups are methyl, ethyl, propyl, hexyl, decyl, hexadecyl, eicosyl and the branched chain derivatives thereof; cyclic hydrocarbons such as cyclopentyl, cyclohexyl, cycloheptyl, cyclooctyl and the like; aromatic hydrocarbons such as phenyl, naphthyl, biphenylyl, benzyl and the like; unsaturated aliphatic hydrocarbons such as ethyenyl, ethynyl, propenyl, propynyl and the like. In addition to being substituted on the alkyl substituent of the benzene portion of said aromatic moiety these hydrocarbons can further be substituted on the other carbons of the aromatic moiety as mentioned hereinbefore.

The metal amides employed as a reactant in the process of this invention are more fully illustrated by the formula

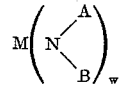

wherein M can be the same as or different from M', N is an alkali or alkaline earth metal, A and B can be the same or different and are selected from the group consisting of hydrogen and lower alkyl radicals, and $w$ is a small whole number.

These metal amide derivatives are readily prepared by reacting an amine with the metal in the presence of a conjugated polyene. For example, n-sodium propyl amide is prepared by reacting n-propyl amine with finely divided sodium in the presence of butadiene. In general, it is preferred to employ lower alkyl radicals which form an amine derivative which boils at about 100° C. or less, and is relatively stable under the reaction conditions. Thus, for example, A or B can be the radicals methyl, ethyl, isopropyl, propyl and the like. The use of the amines or substituted amines, which will result in a derivative having a boiling point below about 100° C. and being comparatively stable under reaction conditions, is preferred since the derivative can be readily removed from the reaction mixture rapidly. Rapid removal of the derivative maintains the course of the reaction toward the formation of the metallometallic organic acid salt.

The metal hydrides employed as a reactant in this invention are alkali or alkaline earth metal hydrides. Thus exemplary of these metal hydrides are sodium hydride, potassium hydride, rubidium hydride, cesium hydride, magnesium hydride, calcium hydride, lithium hydride, barium hydride and the like.

The preferred metallating agents of this invention are alkali or alkaline earth metals. These metals are referred to as Light Metals by Lange in his Handbook of Chemistry and, as set forth therein, include the metals lithium, sodium, potassium, rubidium, cesium, francium, beryllium, magnesium, calcium, strontium, barium and radium. (See Periodic Chart of the Elements set forth at page 58–59 of Lange's Handbook of Chemistry, 6th edition, Handbook Publishers Incorporated, Sandusky, Ohio). When utilizing these Light Metals in the process of this invention, it is preferred to employ them in their dry form. In the preferred case, they are reacted with the alkyl substituted benzoic acid reactant while mixing and grinding the two reactants in their solid form under an inert atmosphere. Because of its great availability, excellent reactivity and cheapness, sodium is the preferred Light Metal employed in the process of this invention.

Of the above discussed metallating agents (i.e. metal amides, metal hydrides, and Light Metals), it is preferred to employ the alkali metal derivatives—particularly the sodium derivative. Thus the preferred metallating agents of this invention are sodium amide, sodium hydride and sodium—the latter being particularly preferred for economical reasons as discussed hereinbefore.

In a preferred embodiment of this invention, the alkali or alkaline earth metal salt of an alkyl substituted benzoic acid is produced from an alkyl substituted aromatic hydrocarbon wherein the aromatic moiety contains an alkyl substituted benzene ring. The process comprises oxidizing said alkyl substituted aromatic hydrocarbon to the free acid and thereafter neutralizing the free acid to produce the alkyl substituted benzoic acid salt. This neutralization can occur in two manners (1) pre-neutralization to produce the acid salt and (2) in situ neutralization, where the neutralization of the free acid occurs by reaction with the metallating agent itself.

The alkyl aromatic hydrocarbon which generally is employed is an alkyl aromatic hydrocarbon wherein the aromatic moiety contains a benzene ring substituted by at least two substituted or unsubstituted alkyl groups (said alkyl groups being as defined hereinbefore) containing at least one α-hydrogen atom and positioned ortho or para with respect to each other. In the preferred case, for purposes of economy, a ring isomeric mixture of the alkyl aromatic hydrocarbon is employed. This mixture can be the ortho or para alkyl derivatives. For some purposes it can be both ortho and para derivatives. Furthermore the mixtures can contain a small to substantial amount of the meta isomer—generally anywhere from about 1 through 50 percent. In the alternative, the ortho or para derivative can be pre-separated so that the isomeric mixture employed as a starting material contains ortho isomer and a small to substantial amount of meta isomer, or para isomer and a small to substantial amount of meta isomer. This pre-separation step can be undertaken with very little expense since the ortho and para isomers are easily separated one from the other. However it is very difficult to separate the meta isomer out of the crude mixtures. Thus the term alkyl substituted aromatic hydrocarbons include the following specific illustrative compounds: o-xylene, p-xylene, a mixture of o-xylene and p-xylene, a mixture of o-xylene and m-xylene, a mixture of p-xylene and m-xylene, 1,4-dimethylnaphthalene, 1,4-dimethylanthracene, 1 - methyl-2-eicosyl-benzene, o-isopropyl toluene, o-3-butenyl toluene and the like.

By the term carboxylation as used herein is meant a reaction of the metallometallic salt of an aromatic monocarboxylic acid with either (1) carbon dioxide or (2) alkali metal carbonates. The carbon dioxide or carbonate reacts with the metallometallic salt at the

bond in a conventional transmetallation reaction, wherein the metal moves to form a bond with the oxygen of the carbon dioxide, or carbonate moiety, and, in place of the

bond, there is formed a carbon to carbon bond. In result, what happens is a dicarboxylic acid salt is formed, containing one more carbon than was present in the metallometallic salt of an aromatic monocarboxylic acid reactant. Demonstrative of this conversion by carboxylation to the dicarboxylic acid salt is the carboxylation of α-sodio-sodium p-toluate or α-sodio-sodium o-toluate to produce the sodium salt of homoterephthalic acid or the sodium salt of homophthalic acid respectively.

The metals employed as substituents in the reactants or products of this invention are the alkali and alkaline earth metals—termed Light Metals by Lange in his Handbook of Chemistry (i.e. see Periodic Chart of the Elements, Lange's Handbook of Chemistry, 6th edition, pages 58–59). More specifically, these metals are the Groups I-A and II-A metals of the Periodic Chart of the Elements. Thus within the Group I-A metals are included lithium, sodium, potassium, rubidium, cesium and francium, and within the Group II-A metals are beryllium, magnesium, calcium, strontium, barium and radium.

The temperatures employed range from those sufficient to initiate reaction—as evidenced by gas evolution—up to the decomposition temperature of the product produced. Generally, temperatures ranging from about 90° through about 220° C. are employed. Excellent results have been obtained at temperatures ranging from about 160° to about 200° C. and for this reason it is preferred to employ this latter temperature range.

In general, atmospheric pressures are employed. However, subatmospheric pressures can also be utilized and have the advantage of enhancing removal of the volatile by-products, thus resulting in a more rapid reaction and a more complete shifting of equilibrium.

Although one equivalent of the acid, or acid salt, per equivalent of metallating agent is preferred an excess of either reactant can be employed—the excess usually being no greater than about 20 percent by weight. In most cases, however, it is especially preferred to employ the metallic salt of the aromatic monocarboxylic acid in about 5 to 10 percent excess (based on equivalents of acid salt to equivalents of metal) so that the metallating agent employed can be quantitatively consumed. The product obtained in this manner may contain some metallic salts of organic acids, but this impurity has not been found detrimental in subsequent use of the metallometallic salts of organic acids.

In some cases it has proven desirable to utilize a metallating agent charge which is stoichiometric to the ortho or para isomer content of the alkyl substituted benzoic acid reactant. Thus where an isomeric mixture containing 50 percent of the ortho isomer and 50 percent of the meta isomer is utilized the amount of metallating agent utilized is determined on an equivalent basis relative to the ortho isomer only.

It is usually preferred to conduct the process of this invention as a solid-solid heterogeneous reaction in a ballmill reaction. Thus, the alkyl substituted benzoic acid, or salt thereof, and the metallation agent are placed in the ballmill and the reaction carried out while mixing and grinding is effected. For some purposes, however, it is desirable to conduct the reaction under an inert liquid blanket. One of the purposes for such an embodiment is to avoid oxygen contamination by impurities in the flushing gas. The inert liquid blanket employed is generally a high boiling hydrocarbon, such as mineral oil. In some cases ethers such as dimethyl ether of diethylene glycol can also be employed.

The particle size of reactants is important. In general, it is preferred to employ particle sizes below about 100 microns and usually below about 50 microns. The smaller the particle size, the shorter the reaction periods. Thus, best results have been obtained when the particle size of the reactants are less than 10 microns. In carrying out the process, the reactants are mixed and ground in the reaction vessel and heated. Although not required, this is the preferred operation. It should be understood that the reactants can also be pre-ground or pre-mixed, and further, can be fed to the reactor separately in larger particle sizes and thereafter mixed and ground in situ. This is particularly true when the agitation provided in the reactor is of a type to provide grinding of the reaction mixture during the course of the reaction. Employing the technique of the grinding, along with the agitation, enhances the contact between the reactants, thus providing more complete reaction. One highly preferred method of obtaining this objective is to employ a ballmill as a reactor, although any tumbling mill can be employed, such as the pebble mill, rod mill, tube mill or compartment mill. Other milling apparatus can also be employed as will now be evident to those skilled in the art.

The reaction should be conducted in an inert atmosphere such as argon, nitrogen, krypton and the like. It is preferable that the inert atmosphere be pre-purified so as to be substantially free of impurities, such as oxygen and moisture, since these impurities may be taken up in the product.

The time of the reaction varies from instantaneous to about 20 hours. These times are related to the rates of attrition, when a solid-solid reaction is conducted, and heat transfer. Thus time will be dependent upon the type of equipment utilized. Best times have been achieved utilizing ballmill equipment. In this type of equipment generally the metallation reaction is completed in less than 1 hour.

The metallometallic salts produced by the process of this invention are alkali or alkaline earth α-metallometallic salts of aromatic monocarboxylic acids. These compounds are more fully demonstrated in the following illustrative formula

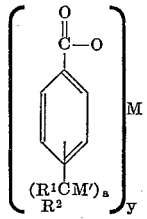

wherein $R^1$ and $R^2$ may be hydrogen or an alkyl, alkenyl or aryl substituent (such as those defined hereinbefore), M and M' are alkali or alkaline earth metals and the group ($R^1R^2CM'$) is ortho or para substituted on the aromatic ring. The aromatic ring may be further substituted with hydrocarbon or inert groups or may be part of a condensed ring system such as naphthalene, tetralin, or anthracene. The subscript $y$ is an integer equal to the valence of the metal M. Subscript $a$ is an integer from 1 through 5 and preferably 1 through 3. Thus, although the group ($R^1R^2CM'$) is substituted ortho or para on the aromatic ring said group can in addition be meta substituted. In the preferred case M' is an alkali metal—particularly sodium.

Further illustrative of the compounds produced by the process of this invention are α-sodio-sodium p-toluate, α-sodio- sodium o-toluate, 4-(α-lithiodecyl)-1-naphthoic acid, α-potassio-magnesium toluate, the calcium salt of 4-(α-rubidioeicosyl)-benzoic acid, α-bario-cesium toluate, α-magnesio-sodium toluate, and the like.

In addition to being an intermediate in the preparation of aromatic dicarboxylic acids, these compounds have a wide range of other utilities as will be shown more fully herinafter.

The following example demonstrates that reactants which contain condensed rings can be utilized as the aromatic monoacid reactant of this invention. The following example further demonstrates that the free acid can be converted to the acid salt prior to the metallation reaction.

*Example IV*

To a reaction vessel are added 93 parts of isomeric methyl-1-naphthoic acid (97 percent of the 4-methyl and 3 percent of the 3-methyl isomer) and 28 parts of potassium hydroxide. This mixture is then diluted with 200 parts of $H_2O$ and the mixture stirred until all the acid is gone into solution. Thereafter the water is evaporated off under vacuum and the resultant salt dried under vacuum at 150° C. This material is then added to a ballmill reaction vessel such as that described hereinbefore and utilized in Examples I–III. Also added to the ballmill are 20 parts of potassium. Heating and grinding is then commenced and the reaction mass is brought to a temperature of from about 140 to about 190° C. This temperature is maintained until hydrogen evolution ceases. At this point the reaction mixture is cooled to room temperature and the product, the potassium salt of 4-potassiomethylene-1-naphthoic acid, is thereby obtained in better than 70 percent purity. This product contains no meta isomer.

*Example V*

To a reaction vessel provided with means for heating, refluxing, stirring, gas inlet and outlet, and means for addition are added 88 parts of 5,6,7,8-tetrahydro-2-naphthoic acid and 28 parts of potassium hydroxide. This mixture is diluted with approximately 200 parts of $H_2O$ and the resulting reaction mixture stirred until complete solution of the acid is obtained. Thereafter the water is evaporated from the reaction mixture under vacuum and the resultant acid salt dried under vacuum at approximately 150° C. The resulting dried product, which is the potassium salt of the aforementioned acid, is blended with 19.5 parts of sodium amide and ground to approximately 100 micron particle size. This ground material is then gradually fed to a heated reaction vessel, provided with means for nitrogen gas flush, at a temperature of about 195 to 200° C. Ammonia is evolved and, after all the material is added, heating is continued, until no further ammonia evolution occurs. The resultant product, the potassium salt of 5-sodio-5,6,7,8-tetrahydro-2-naphthoic acid, is cooled to about 25° C. The cooled reaction product is then fed into a stirred reaction vessel, heated to about 80 to 100° C. and under carbon dioxide sweep. The reaction is allowed to run for a period of 4 hours at which time the vessel is cooled and the resultant product is hydrolyzed, followed by acidification, to produce the free acid, 5-carboxy-5,6,7,8-tetrahydro-2-naphthoic acid in good yields and free from the 8-carboxy isomer.

*Example VI*

To a ballmill, as described in Example I, is added 102 parts of the calcium salt of n-propyl benzoic acid (90 percent para and about 10 percent meta isomer) and 4 parts of lithium hydride. Heating and grinding is commenced and the reaction temperature is brought to 50° C., held at this tempreature for a short period, and thereafter raised slowly to a temperature of 185° C. This temperature is maintained until no further hydrogen evolution occurs. The mixture is cooled to room temperature (i.e. about 25° C.) and the product, the calcium salt of α-lithio-p-n-propyl benzoic acid, is obtained in good purity, free from the meta isomeric derivative.

The following working example demonstrates that "mixed" metallating agents can be employed in the process of this invention. By mixed metallating agents is meant mixtures of alkali or alkaline earth metals. These mixtures produce lower melting metallating compositions which result in increased reactivity and better product purities and the like.

*Example VII*

To a ballmill as described in Example I is added 80 parts of isomeric sodium-2-toluate (90 percent ortho and 10 percent meta) in 11 parts of sodium metal and 1 part calcium metal. Heating and grinding is commenced and the temperature of the reaction mass is brought rapidly to 175° C., and maintained at this temperature until no further gas evolution occurs. The product is cooled to about 25° C. and discharged. After the product has been cooled the ballmill is pressured with carbon dioxide gas and the temperature brought to about 100 to 125° C. This temperature is maintained for a period of approximately 4 hours after which time the reaction vessel is again cooled to approximately 25° C. and the product is hydrolyzed in water, and subsequently acidified to produce the homophthalic acid in good yields and free from the meta isomer.

The carboxylation of the metallometallic aromatic monocarboxylic acid can be effected at the general temperature at which the reaction is initiated up to the decomposition temperature of the metallometallic aromatic carboxylic acid starting material. Initiation of the reaction is evidenced by carbon dioxide uptake. The reaction can be run under atmospheric pressure, although it is preferred to employ nominal pressures in order to effect more complete conversion to the desired dibasic acid and, furthermore, to hasten the course of the reaction. The carboxylation step can be conducted in situ in the reaction vessel in which the metallation step is effected. However, for some purpose it may be desirable to conduct the carboxylation step in a separate reaction vessel. Such a preferred case would be where the metallation step is a continuous process. The carboxylation reaction can be effected employing various inert solvents such as hydrocarbons and ethers. Stoichiometry does not appear to be critical in the conducting of the carboxylation reaction and generally excess carbon dioxide is employed. In addition to carbon dioxide gas which is described hereinbefore as carboxylating agent for the carboxylation process of this invention, it is possible to employ, as a carboxylating agent, organic carbonates such as ethyl, propyl and the like carbonates and any other aliphatic carbonate having a decomposition temperature falling in the range of about 25° C. to about 220° C. Furthermore any other carbonates, organic or inorganic, which have a decomposition temperature within this temperature range can be employed in the process of this invention.

The alkali or alkaline earth metallometallic salts of a monocarboxylic acid produced by the process of this invention and which are particularly useful as an intermediate in the preparation of aromatic dicarboxylic acid, as discussed hereinbefore, also find numerous utility in a wide field of applications. For example, the metallometallic salts of a monocarboxylic acid can be reacted with halogens to produce symmetrical aromatic dibasic acids.

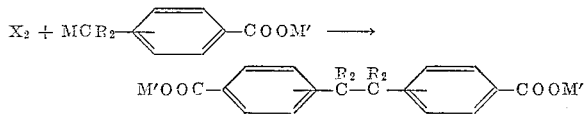

In the above formula X is a halogen; M is an alkali metal; M' is an alkali or alkaline earth metal different from M; and R is a hydrocarbon group. The substituent (MCR$_2$) can be substituted ortho or para on the aromatic ring. The aromatic ring may be further substituted with organic or inert groups or may be part of a condensed ring system, such as naphthalene, tetralin or anthracene.

Generally in conducting this reaction an inert solvent can be employed and a temperature ranging from 0 to about 100° C. The proportions of reactants do not appear to be critical and in most cases the halide is employed in excess—generally the reaction being conducted by passing the halogen gas into the metallometallic salt of a monocarboxylic acid contained in appropriate inert solvent.

The following working example more fully demonstrates the process:

*Example VIII*

Into a reaction vessel provided with means for heating, stirring, refluxing and gas inlet and outlet is added 50 parts of α-sodio-sodium p-toluate contained in 200 parts of normal octane. Stirring is commenced and chlorine gas is bubbled into the reaction vessel while maintaining the temperature at about 40° C. When the blue color of the sodio compound has been completely discharged the reaction is shut down and the reaction mass discharged. The solids are filtered off. This material is then hydrolyzed and acidified to produce the product, 1,2-di(p-carboxyphenyl)ethane, in good yield.

Symmetrical dibasic acids produced in the above manner find wide utility in the polymer field for the production of films and fibers.

The metallometallic salts of monocarboxylic acids can also be oxidized, by either oxygen or sulfur, as is demonstrated by the following illustrative formula:

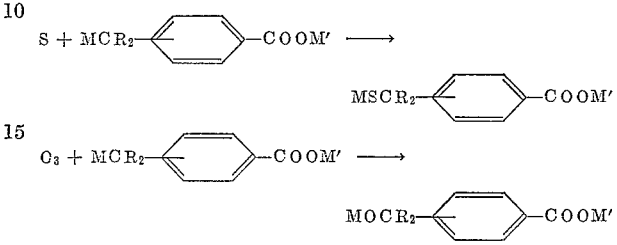

wherein M, M' and R are as defined hereinbefore in the discussion of the preparation of symmetrical aromatic dibasic acids.

These products can be acidified to give the corresponding hydroxy or mercapto acids which can be used for monomers for preparing polyesters or polyvinyl esters to be used in various plastic applications. An example which demonstrates this process follows:

*Example IX*

Into a reaction flask is placed approximately 80 parts of α-sodio-sodium p-toluate and approximately 16 parts of elemental sulfur suspended in 500 parts of toluene. The material is then refluxed for a period of 3 hours. At the end of this period the solids are filtered from the reaction mixture, the product hydrolyzed and any excess sulfur is filtered off. The pH of the aqueous solution is adjusted to a pH of about 8, calcium chloride is then added and the calcium salt of the desired product is filtered off and dried. This product, the calcium salt of p-carboxy benzyl mercaptan, is obtained in good yield.

In carrying out the above described reaction with sulfur, or oxygen, inert solvents, such as hydrocarbon solvents and ethers can be employed. When sulfur is employed, the solvent should be selected on the basis of low solubility or elemental sulfur thus providing mild oxidated conditions. If a high solubility solvent is employed i.e. a solvent which has high solubility for sulfur, along with more vigorous conditions, then the disulfide, rather than the mercaptide, will be produced. In general, in producing the mercaptide, temperatures ranging from 25° to about 150° C. are employed. The proportions of reactants employed are generally stoichiometric (based on 1 equivalent of sulfur per equivalent of metal as the metallo substituent).

In addition to the above uses the metallometallic salts of monocarboxylic acids produced in this invention can be reacted with organic halides—both monohalo and polyhalo derivatives—to produce long chain monobasic acids, long chain dibasic acids, or polyesters, depending upon the reaction conditions chosen. In this latter respect starting materials and proportions of reactants utilized in conducting the reaction are highly important. Thus if one employs proportions of 0.72:1 to 1.50:1 of the organic monohalide to metallometallic salt of a monocarboxylic acid, there is produced a salt of a longer chain monocarboxylic acid. On the other hand, if there is employed a ratio of 1.75:1 to 2.50:1 (or higher) of the organic monohalide to the metallometallic salt of a monocarboxylic acid, there is produced the corresponding organic ester of the longer chain carboxylic acid. In carrying out these reactions it is also important to utilize proper temperature conditions. Lower temperatures favor the formation of the acid salt and higher temperatures favor the formation of the corresponding ester. The order of addition of the reactants is also important and it is preferred in producing the acid salt to add the halide to the suspension containing the metallometallic salt of a monocarboxylic acid. In producing the ester it is preferred to add the metallometallic salt of a monocarboxylic acid to the halide. In conducting the reaction, when utilizing an organic polyhalide, the above general principles also hold true. The following working examples more fully demonstrate this reaction.

*Example X*

Into a reaction vessel provided with means for heating and stirring is added 1 mole of α-sodio-sodium o-toluate as a suspension in 500 parts of tetrahydronaphthalene. This slurry is raised to a temperature of about 80° C. to 100° C. One mole of octylbromide is added to this suspension slowly over a period of 2 hours, while stirring is effected. The mixture is stirred for an additional hour and thereafter cooled. The solids are filtered off, washed with hexane and dried. The dried solids are hydrolyzed with water and subsequently acidified to precipitate the free acid, o-n-nonylbenzoic acid, in good yield.

When the above reaction is repeated, with the exception that (1) 2 moles of halide to 1 mole of the α-sodio-sodium o-toluate are employed; (2) temperatures of about 150° C. are utilized and (3) the method of addition is reversed, the octyl ester of o-n-nonylbenzoic acid is produced in good yields.

The following example demonstrates the utilization of an organic dihalide in producing dibasic acids from the metallo-metallic salts of a monocarboxylic acid of this invention.

To a reaction vessel provided with means for heating and stirring is added 1 mole of α-sodio-sodium p-toluate as a slurry in 500 parts of tetrahydronaphthalene. This mixture is raised to a temperature of about 170° C. and 0.5 mole of 1,4-dichlorobutane is added slowly over a period of 2 hours. The mixture is heated for an additional three hours at about 170° C. and then cooled. Upon filtering to remove solids the filtrate is hydrolyzed and acidified to precipitate the product, 1,6-di-(p-carboxyphenyl)hexane in good yield.

The metallometallic aromatic monocarboxylic acids can also be reacted with lactones to produce omega (carboxy aromatic) aliphatic acids. The following example demonstrates this use of the metallometallic aromatic monocarboxylic acids of this invention.

*Example XI*

Into a reaction vessel provided with means for heating, stirring, refluxing and addition were added under nitrogen atmosphere 59.5 parts of α-sodio-sodium p-toluate in about 150 parts of tetrahydrofuran. The mixture was brought to reflux temperature and 18 parts of propio lactone in 50 parts of tetrahydrofuran were added to the reaction mixture over a period of 3 hours. After the addition, the reaction mixture was heated at reflux temperature for a total period of 3 hours. Upon cooling the reaction mixture became extremely thick and viscous. The solid product of this material was filtered off and washed with hexanes and thereafter dried. The solid material was dissolved in water, and then acidified with hydrochloric acid to a pH of about 1.0. The precipitated acid, gamma (p-carboxyphenyl)butyric acid, was filtered, dried and recrystallized from water solution. There was 23.8 parts of the precipitated gamma(p-carboxyphenyl)butyric acid. The melting point of this material is 225° C. and the material sublimed at approximately 210° C. A carbon analysis was run on the material (calculated for gamma (p-carboxyphenyl)butyric acid).

Theoretical: C=63.4
Found: C=63.38

The neutral equivalent of gamma(p-carboxyphenyl) butyric acid was calculated to be 208.2 and was found to be 203.

In carrying out reactions of metallometallic salts of carboxylic acids with lactones reaction temperatures ranging from about 50 to about 150° C. are generally employed. It is preferred to add the lactone to the metallometallic salt of an aromatic monocarboxylic acid, generally with the latter material being suspended in an inert solvent, such as hydrocarbons, or inert ethers, such as tetrahydrofuran, dimethyl carbitol, the dimethyl ether of ethylene glycol and the like. In carrying out the reaction, other lactones than propio lactone can be employed to produce the corresponding addition product through cleavage of the lactone ring with the metallometallic salt of an aromatic monocarboxylic acid. The reaction is generally carried out at essentially stoichiometric proportions. However an excess of the metallometallic salt of the monocarboxylic acid can be employed. Such excess generally not exceeding 20 percent.

In addition to the above mentioned lactones, epoxides, such as ethylene oxide or styrene oxide can be employed in a reaction with the metallometallic salts of aromatic monocarboxylic acids. In this fashion are produced gamma metal alkoxy substituted aromatic monocarboxylic acids. For example, when α-sodio-sodium o-toluate is reacted with ethylene oxide, the sodium salt of gamma (o-carboxyphenyl)sodium propoxide is produced.

The metallometallic salts of aromatic monocarboxylic acids may also be alkylated with various olefins or poly olefins as for example the reaction between α-sodio-sodium p-toluate and ethylene to produce the sodium salt of a p(α-ethanated toluic acid). Temperatures up to 200° C. and pressures ranging from atmospheric to 2000 p.s.i. can be used.

Reaction with epichlorohydrin is another use of the metallometallic salts of aromatic monocarboxylic acids of this invention. By such reaction long chain polymers containing both ether and ester linkages can be produced. An example of this reaction is the reaction between α-sodio-sodium p-toluate and epichlorohydrin to produce a poly ether containing some ester linkages. This reaction is generally carried out at 50 to about 150° C. under atmospheric pressure utilizing stoichiometric proportions of the reactants. In some cases an excess of the epichlorohydrin can be employed.

The monocarboxylic acids can also be reacted with ketones or aldehydes to produce monomeric substances useful in the preparation of poly esters. An example of this reaction is the reaction between α-sodio-sodium o-toluate and benzophenone. This reaction is carried out similarly to the preceding reaction described with epichlorohydrin. Mercaptans can be produced by the reaction between metallometallic salts or aromatic monocarboxylic acids with sulfur monochloride. In such a fashion disulfides are produced which, upon acidification and reduction, give the corresponding mercaptan.

The aromatic dicarboxylic acids produced in this invention find wide utility in the preparation of fibers, resins, films and other coating materials and other polymeric substances. One of the chief advantages of utilizing such aromatic dicarboxylic acids, in particular such acids as homoterephthalic, is the increased low temperature flexibility which is obtained in fibers and films produced by the incorporation of such a monomeric substance therein. In this latter regard the aromatic dicarboxylic acid can be utilized as the sole dibasic acid incorporated in the polymeric structure or can be employed in combination with another dicarboxylic acid, such as terephthalic acid. An example of such utility would be the incorporation of homoterephthalic acid into a condensation polymer produced by condensation of ethylene diglycol and terephthalic acid. Another example is the incorporation of homoterephthalic acid in high polymeric condensation products produced by the reaction of a dibasic carboxylic acid with aromatic diamines, such as is more fully described in U.S. 2,918,454.

The aromatic dibasic acids of this invention are also useful in surface coating applications. Thus, the dibasic acids can be polymerized with diols to form alkyd resins for use in surface coatings. These alkyd resins may be used in combination with other film forming polymers and applied in solution, or as emulsions for industrial finishes, interior paints or exterior paints.

The dibasic acids produced may also be used to produce diesters or may be used in the production of low molecular weight poly esters for application as plasticizers to give desirable properties to films, molded products, coatings and flowing materials and in lacquers.

Polymerization with diols to produce poly ester plastics for use as electrical insulation, packaging, photographic film base, recording tapes, drum liners, glazing, metallized yarn and other such uses form another utility for the dibasic acids of this invention. For these uses the diol employed may be such diols as ethylene glycol and the dibasic acid may be converted to the dimethyl ester for more ready polymerization. In carrying out the polymerization various solvents such as hydrocarbons, ethers and the like can be employed. Generally it is not necessary to use stringent temperature conditions and the reactions are usually carried out up to about 150° C. Generally atmospheric pressures are employed.

As mentioned hereinbefore the dibasic acids can be polymerized by reaction with diamines to form polyamide plastics for use as molding powders and also to form monofilaments in nylon-type plastics. In this latter regard reaction of the dibasic acids, particularly homoterephthalic acid with polyamines or polyols to form fibers is particularly applicable to the preparation of tire cording. At present much difficulty has been experienced with synthetic fiber tire cording, particularly of the nylon type, when low temperature conditions are encountered. Due to the high crystallinity of these materials, low temperature decreases the flexibility thereof resulting in a tire which gives a "hard ride." Modification of the synthetic fiber cord can be effected by incorporation of up to 20 percent of dibasic acid such as homoterephthalic acid into the polymeric structure. In this fashion the crystallinity of the polymeric material is decreased and the flexibility of the material at low temperature is consequently increased.

Another utility of the dibasic acids of this invention is in reaction with diols or diamines to give rubber-like products suitable for production of rubber tires or other such uses. In addition, the aromatic dibasic acids can be reacted with excess diisocyanate and polyurethane formulations to give polyurethane foams.

The dibasic acids can also be reacted with polyhydric alcohols and the resulting products cross-linked with di- or tri-isocyanate to give sticky products suitable for use as adhesives for tapes, bonding products and the like.

The dibasic acids can also be reacted with alcohols of greater than one carbon atom to give diesters suitable for use as marine, tractor, rail and stationary engine, automotive or aircraft application. Similarly, hydraulic fluids for use in any of the above aplications or in lifting equipment can be produced in this maner.

What is claimed is:

1. A process for the preparation of a metallometallic salt of an aromatic monocarboxylic acid which process consists of reacting a metallating agent, selected from the group consisting of metal amides, metal hydrides and metals, with an alkyl substituted benzoic acid containing an alpha-hydrogen atom on said alkyl group and from 8 to about 36 carbon atoms in the molecule; said reaction being conducted under an inert atmosphere at a temperature ranging from about 90° C. to about 220° C.; the metallo and metallic substituents of said aromatic monocarboxylic acid and the metal of said metallating agent being selected from the group consisting of alkali and alkaline earth metals.

2. The process of claim 1 wherein said alkyl substituted benzoic acid is a ring isomeric mixture with reference to the position of the alkyl substituents in relation to the carboxy group on the benzene ring of said benzoic acid.

3. The process of claim 1 wherein said metallating agent is sodium.

4. The process of claim 1 wherein said alkyl substituted benzoic acid is p-isopropyl benzoic acid.

5. A process for the preparation of an alkali metal salt of an $\alpha$-alkali-metallo aromatic monocarboxylic acid which process consists of reacting an alkali metal with an alkyl substituted benzoic acid, wherein said alkyl group contains 1 through 5 carbon atoms and at least 1 hydrogen atom on the $\alpha$-carbon atom, the reaction being conducted at approximately atmospheric pressure in an inert atmosphere and at a temperature ranging from about 160° C. to about 200° C., said reaction being conducted while mixing and grinding the reactants in solid form.

6. The process of claim 5 wherein said alkali metal is sodium.

7. The process of claim 5 wherein said alkyl substituted benzoic acid is p-toluic acid.

8. A process for the preparation of $\alpha$-sodio-sodium-p-toluate which consists of reacting a mixture of sodium-p-toluate and sodium-m-toluate with sodium while mixing and grinding the reactants, said reaction being conducted at atmospheric pressure in nitrogen atmosphere at a temperature of from about 36° C. to about 200° C.

9. A process for the preparation of $\alpha$-sodio-sodium p-toluate which consists of reacting an isomeric mixture of p-toluic acid and m-toluic acid with sodium while mixing and grinding the reactants, said reaction being conducted at approximately atmospheric pressure in an inert atmosphere and at a temperature ranging from about 160° C. to about 220° C.

References Cited in the file of this patent

UNITED STATES PATENTS

| 2,766,280 | Zienty et al. | Oct. 9, 1956 |
| 2,909,565 | De Pree | Oct. 20, 1959 |
| 2,918,494 | Closson et al. | Dec. 22, 1959 |
| 2,954,410 | Frank et al. | Sept. 27, 1960 |

OTHER REFERENCES

Nobis et al.: "Industrial and Engineering Chem.," March 1954, pp. 539–544.